United States Patent [19]

Maier et al.

[11] Patent Number: 5,240,979
[45] Date of Patent: Aug. 31, 1993

[54] SURFACE COATING AND METHOD FOR APPLYING SAME

[75] Inventors: Bruce R. Maier, Columbia, Mo.; Richard B. Metzler, Briarcliff Manor, N.Y.

[73] Assignee: Union Carbide Chemicals & Plastics Technology Corporation, Danbury, Conn.

[21] Appl. No.: 913,023

[22] Filed: Jul. 14, 1992

Related U.S. Application Data

[62] Division of Ser. No. 642,021, Jan. 16, 1991, Pat. No. 5,133,997.

[51] Int. Cl.⁵ .............................................. C08L 75/00
[52] U.S. Cl. .................................... 524/145; 524/366; 524/368; 524/591
[58] Field of Search ................. 524/145, 366, 368, 591

[56] References Cited

U.S. PATENT DOCUMENTS

| | | | |
|---|---|---|---|
| 3,781,238 | 12/1973 | Helm | 260/29.2 T |
| 3,867,171 | 2/1975 | Ellsworth | 117/38 |
| 4,163,814 | 8/1979 | Assai et al. | 427/425 X |
| 4,197,219 | 4/1980 | Damico | 427/388.3 |
| 4,301,053 | 11/1981 | Wolfrey | 428/412 |
| 4,311,764 | 1/1982 | Franz | 428/423.1 |
| 4,423,201 | 1/1983 | Hicks | 528/76 |
| 4,493,912 | 1/1985 | Dudgeon et al. | 523/137 |
| 4,497,932 | 2/1985 | Trovati | 524/591 |
| 4,810,533 | 3/1989 | Smith | 427/292 |
| 4,849,286 | 7/1989 | Milne | 428/336 |
| 4,913,970 | 4/1990 | Hayward et al. | 428/31 X |

FOREIGN PATENT DOCUMENTS

| | | |
|---|---|---|
| 2103441 | 4/1972 | France . |
| 2620441 | 9/1981 | France . |
| 205168 | 9/1987 | Japan . |
| 8904350 | 5/1989 | PCT Int'l Appl. . |

Primary Examiner—Maurice J. Welsh
Attorney, Agent, or Firm—W. F. Gray

[57] ABSTRACT

A surface coating composition and method for applying the same to the inorganic substrates. The composition comprises a moisture-curable aqueous urethane dispersion, a cross-linking agent and an anionic surfactant, wherein the anionic surfactant has a phosphate group substituent. The aqueous urethane dispersion comprises discrete linear aliphatic urethane chains and the several chains are linked together upon curing.

12 Claims, No Drawings

SURFACE COATING AND METHOD FOR APPLYING SAME

This application is a Division of prior U.S. application Ser. No. 07/642,021 filed Jan. 16, 1991 now U.S. Pat. No. 5,133,997.

BACKGROUND AND SUMMARY OF THE INVENTION

The present invention relates to a surface coating, and, more particularly relates to a urethane dispersion that is useful for application to inorganic substrates to provide a chemically and environmentally resistant coating that exhibits a high gloss appearance.

Inorganic, metallic and mineral substrates are particularly susceptible to the deleterious effects of environmental and chemical elements. For example, natural stones such as marble stain easily and are vulnerable to citrus fruit, carbonated beverages, acids, alcohol, and other chemical solvents which etch the surface. In addition, natural stones can be scratched by hard or sharp objects such as broken glass. Therefore, a protective surface coating is commonly applied to marble vanities, bars, desk tops and tables to protect the marble surface and enhance its polished appearance.

Polymeric resin dispersions are commonly utilized as coating compositions, wherein the composition is applied to the substrate surface whereupon the resin cures to provide a protective coating. One problem associated with various resin dispersions is the presence of highly volatile organic solvents which create environmental and safety hazards. To combat the hazards associated with solvent based coating compositions, aqueous polymeric dispersions have been developed which generally undergo a humidity or moisture cure. A moisture cure essentially involves the complete evaporation of the aqueous solvent and cross-linking of the resin to form a hard polymeric coating.

This invention is directed to a moisture curable aqueous urethane dispersion useful as a surface coating composition for inorganic substrates. Other aqueous polymer resin dispersions, based on vinyl derivatives or acrylics, have proven less resistant to chemical and environmental elements, such as ketones, sea salt, acid rain and ultra violet radiation than some urethanes. In the past, urethane dispersions have been suggested for use on inorganic materials. However, particularly in the case of mineral substrates such as granite, fired or adobe brick, marble, limestone, slate or other mineral substrates, a composition that is protective, and which exhibits good adhesion over a period of time without discoloring is lacking in the art.

In order to achieve a glossy and protective finish, the coating composition must exhibit good adhesion to the substrate. This is somewhat problematic when working with mineral substrates due to surface porosity and the latent or subsurface hydroscopic nature of these materials. In the past, a thick primer coat or sealant material has been applied to the natural stone surface prior to application of a top coat. Although the sealant covers the pores and provides a smooth surface for top coat adherence, discoloration and decay of the underlying stone and peeling of the sealant material results due to developed vapor pressure from the latent and subsurface trapped water. Although a coating composition is preferably resistant to water and liquid materials, some degree of breathability or permeability to water vapor is required in the case of mineral substrates since water retention at the surface is common. An ideal coating for inorganic and mineral substrates is therefore both chemically and physically protective while offering some vapor permeation.

U.S. Pat. No. 4,810,533 to Smith discloses utilizing moisture curable urethane resins as coating materials for application to inorganic substrates. However, not all moisture cured urethane dispersions provide a protective adherent coating. Aromatic urethane dispersions tend to progressively form double bonds over time and in the presence of ultra violet light, which causes the coating to become yellow and brittle. Although non-aromatic, thinner urethane coatings are available, they continue to exhibit poor adhesion to inorganic mineral substrates. To realize a smooth glossy finish, the coating composition must flow easily and uniformly over the substrate surface upon application and subsequently cure and harden without stress ripples, checks, blemishes or bubbles. It is known that surfactants can be used to reduce surface tension and promote uniform flow. Although the wettability of the substrate is enhanced through the use of surfactants, when water is dispersible urethanes are used in association with surfactant blends, the loss of water from the resin elements during the moisture cure is often interfered with and substrate adhesion is reduced by the presence of these surfactants.

Surfactants by definition exhibit their desirable properties by preferentially concentrating at surfaces or interfaces, which can prevent adhesion of the composition to the substrate. For example, typical surfactants include alkylated sulfonates or alkylaryl sulfonates. The sulfonate groups are highly soluble in water and when these groups are exposed to water or humidity at the substrate interface, they may solubilize in the water and interfere with permanent resin adhesion. Therefore it is difficult to obtain a smooth and attractive finish and exhibits good adhesion.

To further complicate this problem, sulfonate groups commonly provided in a variety of surfactants tend to progessively form double bonds, especially in oxidizing and ultraviolet light environments, which causes brittleness and yellowing at the interfacial substrate/resin bond.

Therefore, it is an object of the present invention to provide a surface coating, for inorganic metallic and mineral substrates, having a very thin, smooth and fine finished texture without ripples, checks or stippling and which demonstrates extremely good adhesion at the substrate interface and at any secondary interfacial layers.

It is another object of the present invention to provide a surface coating that flows easily and uniformly over potentially large areas of the substrate during application such that a smooth, high gloss appearance is attained.

It is a further object of the present invention to provide a surface coating that is both hard and flexible and which is resistant to physical, chemical and environmental degradation.

It is also an object of the present invention to provide a surface coating which behaves as a fluid barrier while exhibiting water vapor permeability.

It is yet another object of the present invention to provide a surface coating which exhibits excellent adhesion on porous substrates that are hydroscopic in nature.

It is a further object of the present invention to provide a surface coating that is not susceptible to degradation by ultraviolet light, salt, citric acid, alcohol, solvents and other chemicals.

It is also an object of the present invention to provide a surface coating for application to inorganic metallic surfaces and mineral substrates, including natural stone such as marble, fired and adobe brick, granite, limestone and slates.

These and other objects of the present invention are achieved by a surface coating composition comprising a moisture-curable aqueous urethane resin, a cross-linking agent and an anionic surfactant, wherein the surfactant has a phosphate group substituent. The water-borne is provided as an aqueous dispersion of discrete linear aliphatic urethane chains, wherein the resin chains have two or more pendent acid group substituents. The cross-linking agent functions to effect a thorough resin by co-reaction with the pendent acid group substituents during the curing process.

In this invention, interfacial binding, adhesion and stability are enhanced by addition of an anionic surfactant having a phosphate substituent which in a sequential process reduces surface tension, specifically binds to positively charged substrate entities and, upon increasing dryness, provides a substrate interface that is relatively hydrophobic. This process can be demonstrated on positively charged substrates of metal, certain plastics, and mineral compositions.

When this surfactant is combined with the urethane resin of the invention, resin cross-linking during dehydration, film hardening, interfacial adhesion and chemical and environmental resistance are enhanced beyond the expectations of conventional coating technologies. Unexpectedly, the combination of surfactant and aqueous rein complex is highly effective even on surfaces which have latent or bound water and on polished surfaces which have proven extremely difficult to coat with the prior art compositions.

This invention additionally focuses on a method for applying the surface coating composition of the present invention to inorganic materials and in particular encompasses a method for applying the composition to natural stone materials such as marble, fired and adobe brick, granite, limestone and other inorganic substrates. Prior to application of the composition, the substrate surface can be treated to uniquely enhance the ability of the stone surface to interact and bond strongly with the anionic surfactant of the present invention. In another embodiment, the substrate is first coated with a composition comprising the aqueous urethane dispersion and surfactant heretofore mentioned, while excluding he cross-linking agent. A second coat is then applied, wherein the coating composition contains the cross-linking agent. This method results in a uniform coating having superior interlayer resin binding without a discernible interface or weakness between the two layers.

A very thin coating prepared in accordance with this invention has a high gloss and smooth appearance. The surface is hard, exhibiting no evidence of fisheyes, rippling, orange peel or yellowing over time and with exposure to the elements. The finish is not susceptible to degradation by lemon juice, alcohol, UV light, salt spray and several other chemicals. The inventors have formulated a composition that exhibits superior flow upon application to inorganic substrates and adheres strongly to the substrate.

DETAILED DESCRIPTION OF THE INVENTION

The present invention is directed to a surface coating composition generally comprising a moisture-curable aqueous urethane dispersion, a cross-linking agent, and an anionic surfactant, wherein the surfactant is characterized by the presence of a phosphate substituent. The aqueous urethane dispersion comprises discrete linear aliphatic urethane chains, wherein the linear chains preferably have a molecular weight of at least 100,000, and most preferably the molecular weight of the urethane chains ranges from 100,000 to 400,000. The resin chains are characterized by the presence of pendent acid groups, preferably carboxyl groups, wherein each chain generally has at least 2 acid groups along the alkene backbone, preferably at least 20, and most preferably has from 24 to 32 acid groups. The acid groups are generally believed to provide significant cross-linkable sites between the resin chains along the longitudinal axis of the resin groups, wherein the several chains are uniformly linked together upon curing. It is preferred that the urethane resin not have any free cyano, diol or formaldehyde groups which would deleteriously affect the performance of this coating composition.

An important aspect of this invention lies in the linear aliphatic urethane chains which remain discrete in the aqueous solvent and are not cross-linked or otherwise connected until applied to the substrate surface. The dispersion should be alkaline having a pH above 7 and up to about 10, and preferably ranging from 7.5 to 9.5. The aqueous primary solvent and, optionally, co-solvents act as a buffer to maintain proper pH and prevent resin cross-linking. Particularly useful co-solvents are selected from the group consisting of N-methyl pyrrolidone, triethylamine and mixtures thereof. These co-solvents are useful as pH buffer materials and also prevent premature resin cross-linking by chemical interaction with the resin.

In a preferred embodiment, the urethane dispersion comprises discrete linear aliphatic urethane chains in amounts ranging from about 10 to 30% total solids by volume of the total solution, N-methyl pyrrolidone in amounts ranging from about 8 to 30% by volume of the total solution, triethylamine in amounts ranging from 3 to 10% by volume of the total solution, and the remainder being water. A suitable urethane dispersion is available commercially as NEOREZ R-960 (TM of ICI Resins US, Wilmington, Mass.) from ICI Resins US, Wilmington, Mass.

The surfactant component of the present invention functions to decrease surface tension at the urethane substrate interface, to enhance bonding or adhesion of the coating to the substrate surface and to enhance the moisture cure. An anionic surfactant having a phosphate group substituent, and also optionally, a non-ionic surfactant are added to the urethane dispersion in sufficient quantities to lower surface tension below 30 dynes/cm. Fluorinated surfactants are particularly suited for this application, because a very small amount of surfactant can be utilized in the overall composition to obtain the desired surface tension. This is important, because the presence of large amounts of surfactant detracts from the ability of the compositions to firmly adhere to the inorganic substrate.

A particularly useful anionic surfactant is a fluorinated surfactant having a phosphate group substituent. Fluoro-surfactants reduce surface tension significantly in very small concentrations. Additionally the fluorine group adds hydrophobicity to the resulting coating. A suitable fluoro-surfactant is commercially available as Zonyl FSP (T.M. of Dupont Company, Wilmington, Del.) having the general formula:

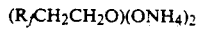

$(R_fCH_2CH_2O)(ONH_4)_2$ where $R_f$ is equal to $F[CF_2CF_2]_{3-8}$

The fluoro-surfactant is present in an amount sufficient to lower surface tension below about 30 dyne/cm. Preferably, no greater than 0.09% volume of active fluoro-surfactant solids based on the total volume of the aqueous urethane dispersion is present.

A surfactant blend comprising the anionic surfactant as heretofore described and a non-ionic surfactant has proven useful. The non-ionic surfactant should be capable of functioning over a broad pH range and should have low surface tension at small concentrations. Typical formulations of non-ionic surfactants are described in various Patents such as Scardera, et al., U.S. Pat. No. 4,207,421 issued Jun. 10, 1980; and Kalolpissis et al., U.S. Pat. No. 3,954,882 issued May 4, 1976. Non-ionic surfactants can be formulated in a wide variety of structures and those that embody the ability to lower the surface tension of the aqueous solutions of urethane and that are dispersible in alkaline solutions can be used in accordance with this invention.

Particularly useful non-ionic surfactants are fluorinated non-ionic surfactants because, as discussed earlier, the surface tension of the compositions can be reduced with small concentrations of the surfactant. Typical non-ionic fluoro-surfactants which are useful for this invention include Zonyl FSN and Zonyl FSO (TM of Dupont Company, Wilmington, Del.).

It is essential that the non-ionic surfactant be present in amounts less than that of the anionic phosphate surfactant. This is to prevent the adhesion problems associated with many surfactants when applied to hydroscopic substrates.

A preferred embodiment of the present invention comprises the urethane dispersion as heretofore described additionally comprising a surfactant blend, wherein the surfactant blend consists of 0.001 to 0.09%, and most preferably 0.005 to 0.03% by volume solids of a fluorinated anionic surfactant having a phosphate substituent based on the total volume of the coating composition, and 0.001 to 0.05%, and most preferably 0.005 to 0.01% by volume solids of a fluorinated non-ionic surfactant based on the total volume of the coating composition. The surfactant blend is added to and mixed with the urethane dispersion heretofore described by any known means and the resulting mixture can be packaged for commercial use.

A cross-linking agent capable of interacting with the pendent acid groups on adjacent resin chains to effect a strong bond between the several resin chains is also provided. This can be accomplished through the addition of a carboxyl reactive cross-linking agent to the urethane dispersion. The cross-linking agent is preferably added to the urethane/surfactant dispersion immediately before application of the dispersion to the substrate surface. This is recommended to prevent denaturation of the agent by the solvents and premature cross-linkage. Most preferably the mixture will be applied to the surface within 30 minutes of adding the cross-linking agent. A preferred cross-linking agent is a cyclic ammonium derivative known as a multi-functional aziridine compound. A multifunctional aziridine compound is commercially available as CX-100 (TM of ICI Resins, Wilmington, Mass.). The aziridine compound is added in amounts ranging from 0.1 to 5.0%, preferably 0.5 to 3.5% by volume of the volume of the urethane/surfactant dispersion.

The surface coating composition of the present invention can be applied to the substrate as a thin coat by brushing, spraying or any suitable method known or developed in the art. Due to the fluidity of the composition, brush marks do not readily appear on the coated surface.

In a preferred embodiment, a series of pre-treatment steps are completed prior to application of the composition onto a natural stone substrate. Any old finish or other coating material must first be removed from the substrate. If the surface has been scratched or otherwise deteriorated, resulting in a non-smooth surface, the substrate should next be ground, preferably with water and diamond abrasives at slow speed. The grit of diamond used will determine the initial smoothness, gloss and distinctness of image of the substrate. Unlike many coating materials, the present composition does not detract from the starting gloss and distinctness of image. Even if restoration is not needed, grinding with 400 grit diamonds as a minimum is preferred before coating the stone.

The substrate surface is cleaned by any useful means to eliminate dirt, lipids, and other contaminates from the surface. A particularly useful treatment includes scrubbing the surface with acetone, followed by scrubbing with alcohol wherein the pH of the alcohol is adjusted to above 7 and preferably 8. A lint free rag is then used to soak up any excess alcohol. The substrate surface may then be wiped with an ammonium derivative and preferably with N-methyl pyrrolidone. The inventors have discovered that adhesion and coating uniformity are substantially enhanced by this treatment.

A pre-coat of the coating composition may be applied to the substrate to improve adhesion and protection. When applying more than one coat, the pre-coat preferably comprises the aqueous urethane and surfactant dispersion heretofore disclosed excluding addition of the cross-linking agent. By omitting the cross-linking agent in the pre-coat, a coating with no discernible separation of layers is provided. The top coat additionally contains the cross-linking agent as heretofore described. In a preferred embodiment, an additional 1 to 5% by volume N-methyl pyrrolidone based on the total volume of the composition is added to the composition. The additional pyrrolidone enhances coating uniformity and promotes a hard cure.

The finish will be dry to the touch in 30 to 45 minutes, although low temperature and high humidity will slow the dry and cure time. Curing the finish will take place over a period of 24 to 96 hours depending on conditions such as temperature, humidity and air circulation. The finish is quite chemically resistant and fluid impermeable and will protect the substrate from otherwise destructive attack by lemon juice or alcohol after 4 to 6 hours. At this stage, however, the coating is still incompletely cured and can still be scratched off. Heat, by baking, infrared light or a heat gun can be used to accelerate the cure. Under normal conditions of temperature and humidity, full protection is obtained 2 to 4 days after application.

EXAMPLE I

Protection and Coating Uniformity

A thin coat of the formulations listed in Tables I and II was applied to clean marble tiles and allowed to cure and harden. Resistance to citrate was determined by applying droplets of lemon juice onto the coated tiles and observing the tile appearance after one hour. Resistance to alcohol was determined by applying a diluted ethanol solution (180 proof vodka) in droplets onto the coated tiles and observing the tile appearance after one hour.

The coated tiles were placed in an ultra violet chamber for over 24 hours to determine resistance to yellowing. General observations relating to appearance, coating uniformity and adhesion were also noted.

The formulations in Table I include a composition (A) made in accordance with this invention and other polymeric resin compositions.

The formulations listed in Table II include a composition (E) made in accordance with this invention and other compositions having varied surfactant blends.

TABLE I

|  | A | B | C | D |
|---|---|---|---|---|
| NEOREZ 960[1] | 66% | 49% | — | — |
| NEOREZ 9670[1a] | — | — | 66% | — |
| NEOREZ 630[1b] | — | — | — | 81% |
| NEOCRYL A 633[1c] | — | 16% | — | — |
| Zonyl FSP[2] | .03% | .03% | .03% | .02% |
| Zonyl FSO[2] | .016% | .016% | .016% | .011% |
| Distilled Water | 32% | 33% | 32% | 18.6% |
| CX-100[1] | 1.3% | — | 1.9% | — |

TABLE II

|  | E | F | G |
|---|---|---|---|
| NEOREZ 960[1] | 79% | 78% | 77% |
| Zonyl FSP[2] | .02% | .011% | — |
| Zonyl FSO[2] | .01% | .016% | — |
| Triton N-57[d] | — | — | .03% |
| Distilled Water | 18% | 19% | 18% |
| CX-100[1] | 2.3% | 2.9% | 2.5% |

% by volume total composition
[1]T.M. of ICI Resins, Wilmington, MA
[2]T.M. of DuPont Company, Wilmington, Delaware
[3]T.M. of Rohm & Haas Co., Philadelphia, PA
[a] an aqueous urethane dispersion containing a cross-linking agent as an integral part of the formulation
[b] an aqueous aromatic urethane resin dispersion
[c] an aqueous acrylic dispersion
[d] a non-ionic surfactant containing a sulfonate group

TABLE III

| | Example I Results | | | |
|---|---|---|---|---|
| | Alcohol | Citrate | UV | Adhesion and Appearance |
| A | + | + | + | high gloss; superior adhesion |
| B | + | − | + | checks & stippling |
| C | − | − | +/− | poor coating uniformity; brush marks |
| D | − | − | − | good coating uniformity |
| E | + | + | + | good coating uniformity; glossy |
| F | +/− | − | + | fair coating uniformity; glossy |
| G | +/− | +/− | + | poor adhesion |

+ represents passing, wherein no visible effect is observed on the coated surface in the form of etching, spots, stains, or yellowing.
− represents a failure, wherein a visible spot, etch marks, softening or yellowing is observed.
+/− represents a slight failure wherein some marks, yellowing or etching is observed.

EXAMPLE II

Flow and Coating Uniformity

The following formulations made in accordance with this invention were applied both as a thin and a thick film to several clean marble tiles. In trials 2 and 3, the tiles were wiped with N-methyl pyrrolidone prior to coating. The flow and spreadability of the composition was observed as well as the appearance of the cured coating. Pinholes or fisheyes refer to holes or void regions where the composition failed to coat the marble surface.

TABLE IV

|  | H | I |
|---|---|---|
| NEOREZ 960[1] | 59% | 58% |
| Zonyl FSP[2] | .029% | .03% |
| Zonyl FSO[2] | .01% | .01% |
| Distilled Water | 38% | 38% |
| CX-100[1] | 1.2% | 1.1% |
| N-methyl pyrrolidone | — | 1.9% |

% by volume total composition
[1]T.M. of ICI Resins, Wilmington MA.
[2]T.M. of DuPont Company, Wilmington Delaware.

Performance was rated on a scale of 1 to 10, wherein 1 represents poor performance and 10 represents a flawless performance.

TABLE V

| | Example II Results | | | |
|---|---|---|---|---|
| | | Pinholes & | Film Uniformity | |
| | Spread | Fisheyes | Thin | Thick |
| Run 1 (H) | 6 | 8.5 | 8 | 7 |
| Run 2 (H) | 8 | 10 | 9 | 8 |
| Run 3 (I) | 8 | 10 | 9 | 9 |

EXAMPLE III

Interlayer Adhesion

A composition made in accordance with this invention exemplified by Formulas A, E, H and I was applied as a thin base coat layer and a second top coat layer onto clean marble tiles. As an alternative method, a composition made in accordance with this invention, but excluding the cross-linking agent was applied in a thin base coat onto clean tiles, and a second composition including the cross-linking agent was applied as a top coat. Interfacial adhesion between the two layers was significantly improved by providing a base coat without the cross-linking agent and a top coat including a cross-linking agent.

EXAMPLE IV

Surface Tension

The static surface tension of the following formulas was measured with a Wilhelmy plate on a surface tensiometer in accordance with procedures identified in Adamson, A. W. *Physical Chemistry of Surfaces* 4th Ed. (John Wiley & Sons NY, N.Y.) 1982, pp. 24-27;

TABLE VI

|  | J | K | L |
|---|---|---|---|
| NEOREZ 960[1] | 60.5% | 45% | 45% |
| Zonyl FSP[2] | .03% | .02% | .04% |
| Zonyl FSO[2] | .015% | .01% | .01% |
| Distilled Water | 39.35% | 52% | 52% |

TABLE VI-continued

|   | J | K | L |
|---|---|---|---|
| N-methyl pyrrolidone | — | 1.9% | 1.8% |

% by volume total composition
[1]T.M. of ICI Resins, Wilmington MA.
[2]T.M. of DuPont Company, Wilmington Delaware.

TABLE VII

Example IV Results

| Formulation | Surface Tension (dyne/cm) |
|---|---|
| J | 26.47 |
| K | 28.72 |
| L | 20.16 |

It will be understood that certain features and subcombinations of this invention are of utility and may be employed without reference to other features and subcombinations.

Since many possible embodiments may be made of the invention without departure from the scope thereof, it is to be understood that all matter herein set forth is to be interpreted as illustrative and not in a limiting sense.

What is claimed is:

1. A coating composition comprising:
   an aqueous dispersion comprising one or more linear aliphatic urethane resins;
   an anionic surfactant having a phosphate substituent; and
   a cross-linking agent capable of facilitating the cure of said urethane.

2. The coating composition of claim 1 wherein at least one of said resins possesses at least two acid group substituents.

3. The coating composition of claim 2 wherein each of said resins possesses at least 20 acid group substituents.

4. The coating composition of claim 1 wherein said anionic surfactant is a fluoro-surfactant.

5. The coating composition of claim 2 wherein said cross-linking agent is a carboxyl reactive cross-linking agent.

6. The coating composition of claim 5 wherein said cross-linking agent is an aziridine derivative.

7. The coating composition of claim 1 additionally comprising a non-ionic surfactant.

8. The coating composition of claim 7 wherein said non-ionic surfactant is a fluoro-surfactant.

9. The coating composition of claim 2 wherein said aqueous dispersion additionally comprises at least one co-solvent capable of buffering the dispersion.

10. The coating composition of claim 9 wherein said co-solvent is selected from the group consisting of triethylamine, N-methyl pyrrolidone and mixtures thereof.

11. The coating composition of claim 9 wherein said aqueous dispersion has a pH ranging from above 7 to about 10.

12. The coating composition of claim 1 wherein said composition has a surface tension below 30 dyne/cm.

* * * * *